United States Patent
Colombini

(10) Patent No.: US 11,877,695 B2
(45) Date of Patent: Jan. 23, 2024

(54) GRINDING MACHINE FOR GRANULAR FOOD

(71) Applicant: COLOMBINI S.R.L., Torinese (IT)

(72) Inventor: Fabio Colombini, Torinese (IT)

(73) Assignee: COLOMBINI S.R.L., Torinese (IT)

( * ) Notice: Subject to any disclaimer, the term of this patent is extended or adjusted under 35 U.S.C. 154(b) by 104 days.

(21) Appl. No.: 17/607,871

(22) PCT Filed: Jun. 29, 2020

(86) PCT No.: PCT/IB2020/056141
§ 371 (c)(1),
(2) Date: Oct. 30, 2021

(87) PCT Pub. No.: WO2020/261248
PCT Pub. Date: Dec. 30, 2020

(65) Prior Publication Data
US 2022/0202244 A1    Jun. 30, 2022

(30) Foreign Application Priority Data
Jun. 27, 2019  (IT) .................... 102019000010326

(51) Int. Cl.
*A47J 42/20*  (2006.01)
*A47J 42/16*  (2006.01)
*A47J 42/40*  (2006.01)
*A47J 42/12*  (2006.01)

(52) U.S. Cl.
CPC ............. *A47J 42/20* (2013.01); *A47J 42/16* (2013.01); *A47J 42/40* (2013.01)

(58) Field of Classification Search
CPC .. A47J 42/12; A47J 42/16; A47J 42/20; A47J 42/40
See application file for complete search history.

(56) References Cited

U.S. PATENT DOCUMENTS

| | | | |
|---|---|---|---|
| 826,711 A * | 7/1906 | Davis ................... | B02C 23/04 241/259.3 |
| 2,692,733 A | 10/1954 | Eastwood | |
| 5,211,344 A | 5/1993 | In Albon | |
| 2018/0078943 A1 * | 3/2018 | Abbiati ................ | B02C 7/02 |

FOREIGN PATENT DOCUMENTS

| EP | 0605750 A1 * | 7/1994 | |
| EP | 0605750 A1 | 7/1994 | |
| FR | 2723301 A1 * | 2/1996 | ............ A47J 19/027 |

OTHER PUBLICATIONS

English translate (EP0605750A1), retrieved date Apr. 27, 2023.*
English translate (FR2723301A1), retrieved date Apr. 28, 2023.*

* cited by examiner

*Primary Examiner* — Matthew Katcoff
*Assistant Examiner* — Mohammed S. Alawadi
(74) *Attorney, Agent, or Firm* — Bayramoglu Law Offices LLC

(57) ABSTRACT

A grinding machine for a coffee, spices or another granular food includes a couple of grinding disks and wherein the couple of grinding disks rotate during a grinding. Among many advantages, the grinding machine provides a lower energy consumption and a lower noise emission at a same ground product rate.

7 Claims, 1 Drawing Sheet

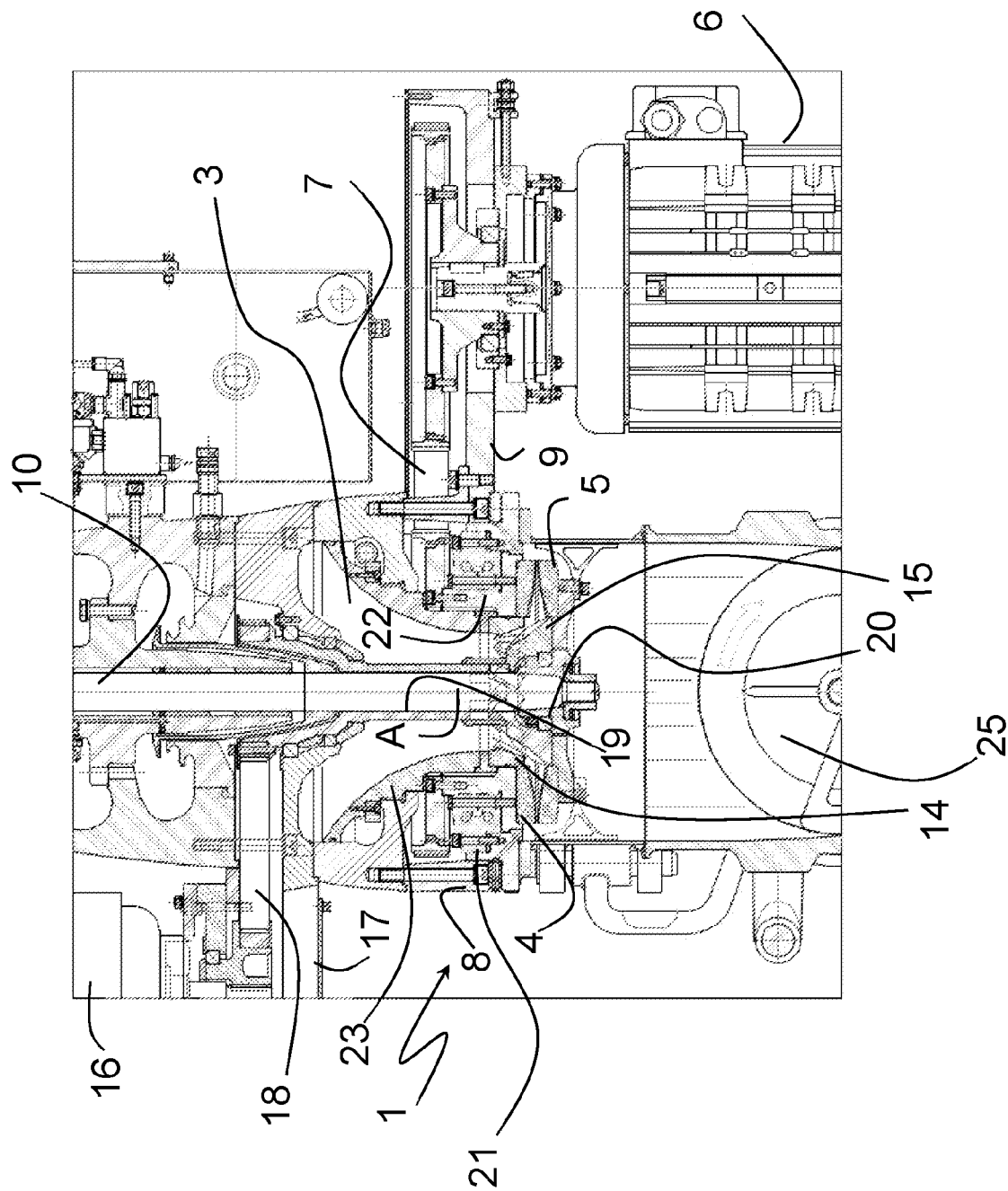

GRINDING MACHINE FOR GRANULAR FOOD

CROSS REFERENCE TO THE RELATED APPLICATIONS

This application is the national stage entry of International Application No. PCT/IB2020/056141, filed on Jun. 29, 2020, which is based upon and claims priority to Italian Patent Application No. 102019000010326 filed on Jun. 27, 2019, the entire contents of which are incorporated herein by reference.

TECHNICAL FIELD

The present invention relates to the field of machines for grinding coffee beans, spices, dried fruit or other dry and/or granular foods and relates to a grinding machine using a pair of superimposed flat or concave/convex grinders, both of which are rotating.

BACKGROUND

It is known that there are various types of grinding machines or devices according to the product to be grinded.

All known devices comprise a grinding unit with two grinding members (hereafter called "grinders") facing each other, cooperating and superimposed, in which one of the two is set in rotation by an electric motor and the other is fixed. The rotation can take place both about a vertical axis, normally in the case of industrial and/or high power machines, and about a horizontal axis, in particular in the case of machines of smaller dimension and power, for example for over the counter use.

"Grinder" means an element equipped with a toothed grinding surface, regardless of whether said grinder is the moving one or the fixed one.

The known grinders can be of two different types:
"flat" obtained from a generally metallic disk with a hole in the center;
"conical" in which the first grinder is the "male" one having a conical surface rotating about its axis inside a second "female" grinder coaxial with said "male" grinder.

Grinding normally takes place by rotating the mobile disk with respect to the fixed disk so that the product to be ground is trapped between the teeth of the disks and minced until it reaches the required size according to the type of substance and the end use.

All known grinding devices have the drawback that being only one of the two grinder to rotate while the other is fixed, they cause elevated temperatures and energy consumption during the grinding process, with a consequent loss of organoleptic qualities of the ground product.

It is therefore very important to limit the temperature rise inside the grinding chamber. During this process, among the multiple factors that contribute to the rise in temperature, it is important that the rotating grinder tends by centrifugal force to carry the product outwards while the stationary one tends to slow down the expulsion.

Therefore, the "rotating grinder—fixed grinder" interaction, due to the induced tribological phenomena, inevitably provide as a significant increase in temperature and a high level of noise. Known grinding devices, due to the aforementioned undesired tribological phenomena, also have the drawback of using a large amount of energy at the expense of the system's energy efficiency and productivity which is inversely proportional.

Finally, the frictions that are generated by the duplet "rotating grinder-fixed grinder" result in a "drift" of the particle size distribution, as a result of the grinding process, difficult to control and foreseeable, to the detriment of the subsequent processing steps of the ground product.

SUMMARY

The object of the present invention is to overcome the drawbacks of the prior art by providing a machine for grinding grains of coffee, spices, dried fruit or other dry and/or granular food substances which is capable of:
 ensure higher hourly productivity for the same amount of energy consumed,
 reduce noise pollution, significantly lowering the decibel emission;
 reduce the increase in average temperature, linked to tribological phenomena, during the grinding process.

These purposes are achieved by means of a grinding machine for coffee beans, spices, dried fruit or other dry and/or granular food substances in which both grinders are rotating.

It has been experimentally verified that the rotation of both grinders allows to reduce energy consumption for the same hourly production, reduce noise and keep both grinders clean thanks to the centrifugal acceleration acting on both. Some experiments, carried out on roasted coffee beans and soft wheat, have shown that, with the invention, it is possible to reduce energy consumption by more than 30% for the same hourly production, between 15 and 25% the increase in temperature and between 20 and 30% of the sound emission level.

The multiple tests carried out have shown that it is necessary to adapt the relative speed of the two grinders, according to numerous factors such as the type of granular food product, the hourly flow rate of the product to be obtained, the average size of the granular product, the state of the granular product, humidity level etc.

Preferably both the first and second grinders are connected to respective independent motors. This provides high flexibility in controlling the speed of the grinders.

Preferably, the lower grinder is driven in rotation by means of a rotating shaft housed in a duct for the gravity feed of the granular product towards the grinders and the upper grinder is guided in rotation by a bearing surrounding the adduction channel.

This configuration limits the impact of the change on a known configuration and, therefore, it is possible to recover a large number of components compared to the previous version of the grinding machine.

According to a preferred embodiment, the grinding machine comprises, upstream of the grinders with respect to a process direction of the granular food, a crushing group comprising a first and a second shaped tool respectively brought into relative rotation together with the first and the second grinder.

It has been verified that the effectiveness of the crushing group also benefits from the rotation of both tools.

Preferably, the first and/or the second driving motor of the grinders are arranged so as to have a rotation axis substantially parallel to the vector direction of angular rotation of the grinders and a flexible transmission is provided to connect each motor in torque transfer to the relative grinder. In particular, at least one of the driving motors are visible e.g. projecting with respect to a machine body defining the adduction channel in order to make maintenance and control operations simple. Furthermore, an endless member transmission, in particular belt transmission, is effective and reduces noise.

According to an embodiment of the present invention, the transmission members to rotate the grinders and the crushing group are driven from above the lower grinder in order to leave a lower channel free to evacuate the ground food and, possibly, associate additional machinery for the transport or treatment of ground food. This facilitates the evacuation by gravity and/or ventilating effect of the ground food and is of particular interest for high flow rates of processed product. Further features and advantages of the invention will emerge from the description of a preferred but not exclusive embodiment of a grinding machine subject of the present patent application, illustrated only by way of non-limitative example in the drawing units where the FIGURE is sectioned view of a grinding machine according to the present invention.

BRIEF DESCRIPTION OF THE DRAWINGS

FIGURE shows a sectioned view of the grinding machine.

DETAILED DESCRIPTION OF THE EMBODIMENTS

According to a preferred—but not limiting—embodiment, the present invention relates to a machine for grinding coffee grains, spices, dried fruit or other dry and/or granular food substances in which both mills are rotating.

Machine 1 object of the present patent application is with vertical loading therefore in its upper part there is an opening inside which the substance to be minced is inserted, which passes through a duct 3 preferably converging downwards in which the granular material accumulates before grinding. Preferably, once crushed by the conical pre-crushing or breaking tools in the appropriate dimensions, the granular material is conveyed by the centrifugal thrust action of the lower "pre-crushing" tool inside the grinding chamber.

In said machine, the grinders are two 4, 5 and they are disc grinders facing each other, superimposed and cooperating with each other to rotate about a preferably, but not exclusively, vertical axis.

In the machine object of the present patent application, in order to solve the drawbacks of the prior art, both grinders 4, 5 are rotated, preferably by means of respective motors, both controlled by two separate inverters. In particular, upper grinder 4 is driven in motion by an electric motor 6 by means of an endless member transmission 7 and in use rotates at a non-zero first speed.

According to the embodiment shown in the FIGURE, electric motor 6 is cantilevered with respect to a central body 8 defining duct 3 and housing grinders 4, 5. This enables access to the motor in case of maintenance and to improve the cooling down.

Preferably, motor 6 is fixed to a bracket 9 projecting from the body 8 so that the relative output shaft connected to the flexible transmission 7 is parallel to an axis of rotation A of grinders 4, 5 surrounded by conduit 3. Preferably the transmission ratio of endless member transmission 7, e.g. a belt transmission, and the speed is variable by means of an inverter, between electric motor 6 and upper grinder 4. The latter is connected to a driven pulley of endless member transmission 7 arranged inside body 8 and surrounding conduit 3. Lower grinder 5 is driven in rotation by a second electric motor (not shown) arranged above body 8 by means of a shaft 10 housed in conduit 3.

In use, upper grinder 4 rotates preferably at a non-zero speed in the same direction with but different from that of lower grinder 5. It is also possible to use the grinders with opposite direction speeds, i.e. opposing. It is also possible that grinders 4, 5 have profiles that in use allow both same and opposing direction angular speeds between the grinders. This, for example, is possible with tooth profiles without undercuts and/or non-mirror profiles between grinder 4 and grinder 5. A tooth without undercuts has two sides converging towards a cutting edge where the sides are arranged on opposite sides of the cutting edge, not on the same part with respect to the cutting edge.

In particular, said two motors are rotatable at different speeds and are independently adjustable from each other in order to be able to properly adjust the relative speeds of the grinders according to the type of product to be ground. Therefore, for example, the relative speed between the millstones can be varied, i.e. increased or decreased, during use.

Two pre-crushing elements 14, 15 are placed near and upstream of lower grinder 5 and upper grinder 4, wherein the first is a hollow conical tool defining a gravity collection channel of the substance to be minced while the second is a counter-conical tool surrounded by said first tool. The function of said crushing elements is to pre-break the granular product before it flows into grinders 4, 5.

In a known way, the lower crushing counter-tool 15 is driven in rotation independently of the grinders by a third electric motor 16 also cantilevered with respect to body 8 like electric motor 6. In the same way, it is supported by a bracket 17 projecting and drives the counter-tool 15 through a flexible transmission 18 with direct transmission ratio and the speed is variable by means of an inverter system. In particular, a driven pulley of endless member transmission 18 is rigidly connected to a sleeve 19 concentric to the axis A and housing shaft 10 inside duct 3. In order to support crushing counter-tool 15 and allow of different rotation speeds, there is a radial bearing 20 carried by shaft 10. Furthermore, sleeve 19 and counter-tool 15 are preferably connected by means of front teeth.

Hollow tool 14 has a known vertical positioning movement and is not further described in detail. The realization of this grinding machine was made possible thanks to the use of a bearing 21 surrounding the adduction channel 3 of the granular material. In particular, an outer ring of bearing 21 is fixed and connected to body 8 and an inner ring is connected to an annular body 22 connected to the driven pulley of endless member transmission 7 and surrounding but spaced by a converging element 23 defining duct 3. In order to drive upper grinder 4 appropriately even at very high angular speeds, outer ring 21 has a radial dimension greater than that of grinder 4. Converging element 23 preferably carries pre-crushing tool 14 and it is movable in vertical direction to adjust the relative position between the pre-crushing tools 14 and 15.

According to an embodiment of the present invention, the transmission members to rotate the grinders and the crushing group are driven from above the lower grinder in order to leave a lower channel free to evacuate the ground food and, possibly, associate additional machinery for the transport or treatment of ground food, e.g. screw augers and compactors-densifiers. As illustrated, a rotor of the upper motor and endless member transmissions 7 and 18 are arranged above lower grinder 5. The FIGURE illustrates a generic transport or processing device 25 for receiving the flow of gravity-ground food through an uncluttered channel, i.e. with full section and without bodies arranged in a radially internal position and such as to divert the flow of ground food. Preferably, grinders 4, 5 are housed inside a channel connected in turn to an input of transport or processing device 25 so as to avoid the dispersion of ground food in the surrounding environment, in particular when grinders 4, 5 rotate at high speed. The channel extends along a direction substantially parallel to the rotation axis of disks 4, 5.

The materials and dimensions of the invention as described above, illustrated in the appended drawings and later claimed, may be any according to requirements. Furthermore, all the details can be replaced with other technically equivalent ones, without thereby departing from the protective scope of this patent application.

According to an alternative embodiment, the lower grinder is carried out by a transmission arranged below the upper grinder. In this way, shaft 10 and the motor are no longer necessary to free the channel from shaft 10.

In addition, it is in general possible that counter-tool 15 is integral with lower grinder 5 and this in particular when the transmission of the lower grinder is arranged lower than the latter, so as to also avoid the presence of sleeve 19.

According to a non-illustrated form of the present invention, the configuration shown in the FIGURE and applied to a machine with vertical axis of rotation of the millstones, can also be applied to a machine with horizontal axis of rotation through a rotation of about 90° of the indicated main components in the FIGURE and the changes that this requires. In this case, for example, also an end section of the granular food feed duct is horizontal and is surrounded by bearing 21. In a traditional horizontal axis machine, a front mill is configured in a similar way to the lower mill, e.g. with its shaft 10, and a rear millstone is fixed. According to an embodiment of the present invention, engine 6 and transmission 7 can be arranged and configured in such a way as to rotate the rear grinder mounted on bearing 21 also arranged on a horizontal axis.

Also in a horizontal axis machine, in addition to the embodiment in which shaft 10 is motorized and surrounded by the rotating rear grinder, it is possible to provide the alternative that motor 16 is arranged on the opposite side of the rear grinder with respect to the front grinder and that shaft 10 is absent. In this case, unlike what happens for a machine with a horizontal axis, the evacuation of the ground food would not be affected at all, which in machines with a horizontal axis takes place by gravity in a substantially radial direction, for example through a vertical duct arranged at the bottom at the millstones.

What is claimed is:

1. A grinding machine for a granular food with a vertical or horizontal rotation axis, comprising:

an upper or rear grinding disk rotating, in use, at a first non-zero speed;
a lower or front grinding disk facing the upper or rear grinding disk configured to rotate at a second non-zero speed different from the first non-zero speed;
a hollow conical tool defining a collection channel of the granular food; and
a conical rotating counter tool surrounded by the hollow conical tool;
wherein
the upper or rear grinding disk and the lower or front grinding disk have a respective frontal facing teeth;
the upper or rear grinding disk and the lower or front grinding disk receive the granular food in a radially internal position;
the upper or rear grinding disk and the lower or front grinding disk expel the granular food after grinding through a radially external opening; and
the hollow conical tool and the conical rotating counter tool are arranged upstream of the upper or rear grinding disk and the lower or front grinding disk to perform a first crushing of the granular food entering the upper or rear grinding disk and the lower or front grinding disk.

2. The grinding machine according to claim 1, wherein directions of the first non-zero speed and the second non-zero speed are opposing.

3. The grinding machine according to claim 2, wherein an adduction duct is configured to guide, by gravity, the granular food towards the upper or rear grinding disk and the lower or front grinding disk and comprising a bearing to guide a rotation of the upper or rear grinding disk and surrounding the adduction duct.

4. The grinding machine according to claim 3, wherein the bearing comprises a fixed outer ring having a maximum external diameter larger than a diameter of the upper or rear grinding disk and an inner ring rigidly connected to the upper or rear grinding disk.

5. The grinding machine according to claim 1, comprising an electric motor connected to the upper or rear grinding disk by a flexible transmission and supported by a projecting bracket with respect to a main body of the grinding machine.

6. The grinding machine according to claim 1, comprising electric and/or electronic drives configured to independently adjust the first non-zero speed and the second non-zero speed of the upper or rear grinding disk and the lower or front grinding disk during grinding.

7. The grinding machine according to claim 1, wherein the upper or rear grinding disk and the lower or front grinding disk are housed in a channel and comprising a treatment or transport device having an input connected to the channel for the granular food to fall by gravity through the input.

* * * * *